(12) United States Patent
Tao et al.

(10) Patent No.: US 10,123,381 B2
(45) Date of Patent: Nov. 6, 2018

(54) FILAMENT CIRCUIT FOR LAMP POWERED VIA BALLAST

(71) Applicant: PHILIPS LIGHTING HOLDING B.V., Eindhoven (NL)

(72) Inventors: Haimin Tao, Eindhoven (NL); Frits Tobi De Jongh, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/557,713

(22) PCT Filed: Mar. 4, 2016

(86) PCT No.: PCT/EP2016/054620
§ 371 (c)(1),
(2) Date: Sep. 12, 2017

(87) PCT Pub. No.: WO2016/146405
PCT Pub. Date: Sep. 22, 2016

(65) Prior Publication Data
US 2018/0063905 A1    Mar. 1, 2018

(30) Foreign Application Priority Data

Mar. 16, 2015 (EP) .................................. 15159157

(51) Int. Cl.
*H05B 37/02* (2006.01)
*H05B 33/08* (2006.01)

(52) U.S. Cl.
CPC ..... *H05B 33/0809* (2013.01); *H05B 33/0887* (2013.01)

(58) Field of Classification Search
CPC ..................... H05B 33/0809; H05B 33/0887
(Continued)

(56) References Cited

U.S. PATENT DOCUMENTS 8,896,207 B2 * 11/2014 Thomas ............. H05B 33/0809
315/185 R
9,163,818 B2 * 10/2015 Hsia ........................ F21V 25/04
(Continued)

FOREIGN PATENT DOCUMENTS

DE       202013000880 U1    2/2013
DE       202015000387 U1    2/2014
(Continued)

*Primary Examiner* — Daniel D Chang (57) ABSTRACT

Filament circuits (1) for lamps (5) powered via ballasts (6) comprise first filament-inputs (11) coupled to first ballast-outputs, second filament-inputs (12) coupled to second ballast-outputs, first circuits (13) comprising resistive components, second circuits (14) comprising reactive components, direct-current paths between the first and second filament-inputs (11, 12) whereby series configurations of the first and second circuits (13, 14) comprise these direct-current paths, and filament-outputs (15) coupled to a driver-input of a driver (3) for driving a light source (4) of the lamp (5). These filament-outputs (15) may correspond with the first filament-inputs (11), or with the second filament-inputs (12). The resistive components may comprise first resistors (16). The reactive components may comprise first capacitors (17) with the second circuits (14) comprising parallel configurations of the first capacitors (17) and second resistors (18), or the reactive components may comprise inductors (20). The first circuits (13) may comprise parallel configurations of the first resistors (16) and second capacitors (19).

7 Claims, 7 Drawing Sheets

(58) Field of Classification Search
USPC .......................................................... 315/291
See application file for complete search history.

(56) References Cited

U.S. PATENT DOCUMENTS

| | | |
|---|---|---|
| 2011/0043136 A1 | 2/2011 | Kpenv |
| 2012/0306403 A1 | 12/2012 | Chung et al. |
| 2014/0035463 A1 | 2/2014 | Miyamichi |
| 2014/0225520 A1 | 8/2014 | Zhang |

FOREIGN PATENT DOCUMENTS

| | | |
|---|---|---|
| WO | 2013124827 A1 | 8/2013 |
| WO | 2014115010 A1 | 7/2014 |

* cited by examiner

FILAMENT CIRCUIT FOR LAMP POWERED VIA BALLAST

CROSS-REFERENCE TO PRIOR APPLICATIONS

This application is the U.S. National Phase application under 35 U.S.C. § 371 of International Application No. PCT/EP2016/054620, filed on Mar. 4, 2016 which claims the benefit of European Patent Application No. 15159157.5, filed on Mar. 16, 2015. These applications are hereby incorporated by reference herein.

FIELD OF THE INVENTION

The invention relates to a filament circuit for a lamp, which lamp is configured to be powered via a ballast. The invention further relates to a device comprising such a filament circuit, and to a lamp comprising such a filament circuit.

Examples of such a device are driving devices. Examples of such a lamp are retrofit tubes for replacing fluorescent tubes.

BACKGROUND OF THE INVENTION

U.S. 2012/0306403 A1 discloses a driver circuit for powering a direct-current lamp in a non-direct-current lamp fitting. This driver circuit comprises two filament circuits each one consisting of two serial resistors or of two serial coils. U.S. 2014035463A1 and U.S. 2014225520A1 disclose a filament circuit with two parallel RC circuits connected in series between the two input pins and the interconnection of the two RC circuits is the output of the filament circuit. U.S. 2014225520A1 and DE202013000880U1 disclose a filament circuit with one parallel RC circuit connected between the two input pins and the input pin is directly the output of the filament circuit.

SUMMARY OF THE INVENTION

In the prior art U.S. 2014035463A1 and U.S. 2014225520A1, power loss is high since the current will flow through the resistors. In the prior art U.S. 2014225520A1 and DE202013000880U1, HF current is very large due to the capacitor shunts the HF current and such large current may damage the ballasts.

It is an object of the invention to provide an improved filament circuit. Further objects are to provide a device and a lamp.

According to a first aspect, a filament circuit for a lamp is provided, which lamp is configured to be powered via a ballast, the filament circuit comprising
 a first filament-input configured to be coupled to a first ballast-output of the ballast,
 a second filament-input configured to be coupled to a second ballast-output of the ballast,
 a first circuit comprising a resistive component,
 a second circuit comprising a reactive component,
 a direct-current path between the first filament-input and the second filament-input, a series configuration of the first and second circuits comprising the direct-current path, and
 a filament-output configured to be coupled to a driver-input of a driver for driving a light source of the lamp, wherein the filament-output is derived from the first filament-input or from the second filament-input or from an interconnection between the first and second circuits.

The filament circuit comprises first and second filament-inputs which are configured to be coupled to first and second ballast-outputs of a ballast, such as for example an electronic ballast. The filament circuit further comprises a first circuit and a second circuit. This first circuit comprises a resistive component. This second circuit comprises a reactive component. The filament circuit further comprises a direct-current path between the first filament-input and the second filament-input. A series configuration of the first and second circuits comprises this direct-current path. In other words, the first and second circuits are serially coupled to each other, between the first and second filament-inputs, and a direct-current path is present via these first and second circuits. The filament circuit further comprises a filament-output configured to be coupled to a driver-input of a driver for driving a light source of the lamp. This filament-output is directly derived from the first filament-input or from the second filament-input. So, this filament-output corresponds with the first filament-input or with the second filament-input. In other words, the filament-output is for example formed by the first filament-input or by the second filament-input. In yet other words, the filament-output may for example comprise the first filament-input or the second filament-input, or vice versa.

The resistive component comprises a first resistor, and the reactive component comprises a first capacitor, and the second circuit comprises a parallel configuration of the first capacitor and a second resistor or the resistive component comprises a first resistor, and the reactive component comprises an inductor. The series configuration of the first and second circuits provides fail safety and reduces a risk of the ballast getting too hot. In case of a single component failure, such as for example an "open" failure or a "short" failure, an impedance of the filament circuit as present between the first and second filament-inputs is still larger than zero, and the ballast cannot get too hot. The series configuration of the first (resistive) and second (reactive) circuits allows a total impedance of the filament circuit to be optimized
 for limiting an amplitude of a high-frequency current flowing through the filament circuit from one of the first and second filament-inputs to the other one, from the first filament-input to the filament-output and/or from the second filament-input to the filament-output,
 for reducing a waveform distortion introduced in the filament circuit,
 for limiting a voltage drop present across the filament circuit between the first and second filament-inputs, between the first filament-input and the filament-output and/or between the second filament-input and the filament-output, and/or
 for reducing a power consumption in the filament circuit.

And the direct-current path guarantees compatibility with most of the electronic ballasts. As a result, a filament circuit has been created that can be fully optimized for a variety of criteria. This is a great technical advantage.

An embodiment of the filament circuit is defined, wherein the first circuit comprises a parallel configuration of the first resistor and a second capacitor.

In case the resistive component comprises a first resistor, and the reactive component comprises a first capacitor, the second circuit needs to be provided with a second resistor in a parallel configuration with the first capacitor to create the direct-current path. In case the resistive component comprises a first resistor, and the reactive component comprises an inductor, the direct-current path is already present. In both cases, the first circuit may be extended with a second capacitor in a parallel configuration with the first resistor.

An embodiment of the filament circuit is defined, wherein the resistive component comprises a first resistor, and the reactive component comprises a first capacitor, and the second circuit comprises a parallel configuration of the first capacitor and a second resistor, or wherein the resistive component comprises a first resistor, and the reactive component comprises a first capacitor, and the first circuit comprises a parallel configuration of the first resistor and a second capacitor, and the second circuit comprises a parallel configuration of the first capacitor and a second resistor.

An embodiment of the filament circuit is defined, wherein the resistive component comprises a first resistor, and the reactive component comprises an inductor, or wherein the resistive component comprises a first resistor, and the reactive component comprises an inductor, and the first circuit comprises a parallel configuration of the first resistor and a second capacitor.

Each first/second resistor may comprise one resistor or may comprise two or more resistors in whatever configuration. Each first/second capacitor may comprise one capacitor or may comprise two or more capacitors in whatever configuration. Each inductor may comprise one inductor or may comprise two or more inductors in whatever configuration. The first resistor may have a value between 1 Ω and 100Ω, the second resistor may have a value between 1 Ω and 1000Ω, the first/second capacitor may have a value between 1 nF and 1000 nF, and the inductor may have a value between 1 µH and 1000 µH.

According to a second aspect, a device is provided comprising the filament circuit as defined above, the device further comprising the driver. Such a device may comprise a driving device or may comprise a lamp wherein the light source is still lacking.

An embodiment of the device is defined, wherein the second filament circuit comprises
  a third filament-input configured to be coupled to a third ballast-output of the ballast,
  a fourth filament-input configured to be coupled to a fourth ballast-output of the ballast,
  a third circuit comprising a further resistive component,
  a fourth circuit comprising a further reactive component,
  a further direct-current path between the third filament-input and the fourth filament-input, a series configuration of the third and fourth circuits comprising the further direct-current path, and
  a further filament-output coupled to a further driver-input of the driver, wherein the further filament-output is directly derived from the third filament-input or from the fourth filament-input, wherein
  the further resistive component comprises a third resistor, and the further reactive component comprises a third capacitor, and the fourth circuit comprises a parallel configuration of the third capacitor and a fourth resistor, or
  the further resistive component comprises a third resistor, and the further reactive component comprises a further inductor.

In a further embodiment, the third circuit comprises a parallel configuration of the third resistor and a fourth capacitor.

Each third/fourth resistor may comprise one resistor or may comprise two or more resistors in whatever configuration. Each third/fourth capacitor may comprise one capacitor or may comprise two or more capacitors in whatever configuration. Each further inductor may comprise one inductor or may comprise two or more inductors in whatever configuration. The third resistor may have a value between 1 Ω and 100Ω, the fourth resistor may have a value between 1 Ω and 1000Ω, the third/fourth capacitor may have a value between 1 nF and 1000 nF, and the further inductor may have a value between 1 µH and 1000 µH.

The first resistor and the third resistor may have similar values or not. The second resistor and the fourth resistor may have similar values or not. The first capacitor and the third capacitor may have similar values or not. The second capacitor and the fourth capacitor may have similar values or not. The inductor and the further inductor may have similar values or not. The first and second filament circuits may be similar circuits or not.

According to a third aspect, a lamp is provided comprising the filament circuit as defined above and further comprising one or more of the driver and the light source. Such a lamp may comprise the driver without the light source, or the light source without the driver, or both the driver and the light source.

According to a fourth aspect, a lamp is provided comprising the filament circuit as defined above and further comprising the light source, wherein the light source comprises a light emitting diode circuit.

A light emitting diode circuit comprises one or more light emitting diodes of whatever kind and in whatever configuration.

A basic idea is that a filament circuit should comprise, between its filament-inputs, a direct-current path, as a part of a series configuration of a first circuit that comprises a resistive component and a second circuit that comprises a reactive component.

A problem to provide an improved filament circuit has been solved. Further advantages are that safety can be provided to a combination of the lamp and the ballast, an amplitude of a high-frequency current as produced by an electronic ballast can be limited, a waveform distortion can be reduced, a voltage drop can be limited, a power consumption can be reduced, and compatibility with most electronic ballasts can be guaranteed.

These and other aspects of the invention will be apparent from and elucidated with reference to the embodiments described hereinafter.

DETAILED DESCRIPTION OF EMBODIMENTS

Figure 1:
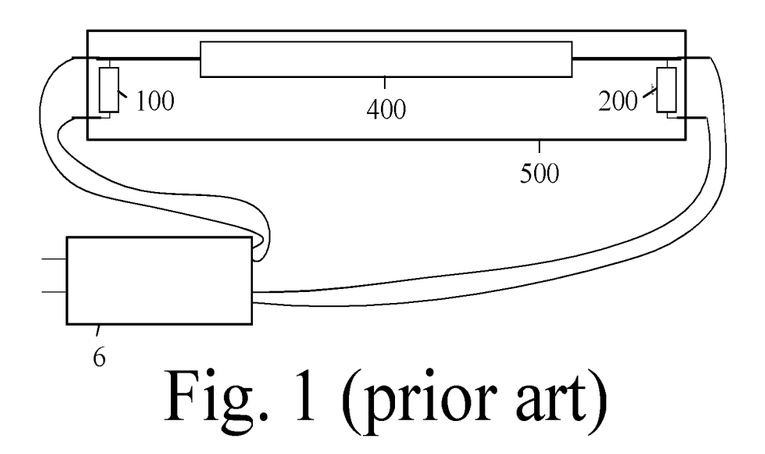
FIG. 1 shows a prior art lamp.

In the FIG. 1, a prior art lamp is shown. The prior art lamp 500 comprises a first filament circuit in the form of a resistor 100 and a second filament circuit in the form of a resistor 200. Both sides of the resistor 100 are coupled to first and second ballast-outputs of a ballast 6, and both sides of the resistor 200 are coupled to third and fourth ballast-outputs of the ballast 6. One of the sides of the resistor 100 and one of the sides of the resistor 200 are coupled to a light source 400 possibly including a driver. Ballast-inputs of the ballast 6 are configured to be coupled to a supply such as mains.

Alternatively, a prior art driver circuit is shown in U.S. 2012/0306403 A1 for powering a direct-current lamp in a non-direct-current lamp fitting. This driver circuit comprises two filament circuits each one consisting of two serial resistors or of two serial coils, wherein the interconnections between the serial resistors or between the serial coils form the filament-outputs.

Figure 2:
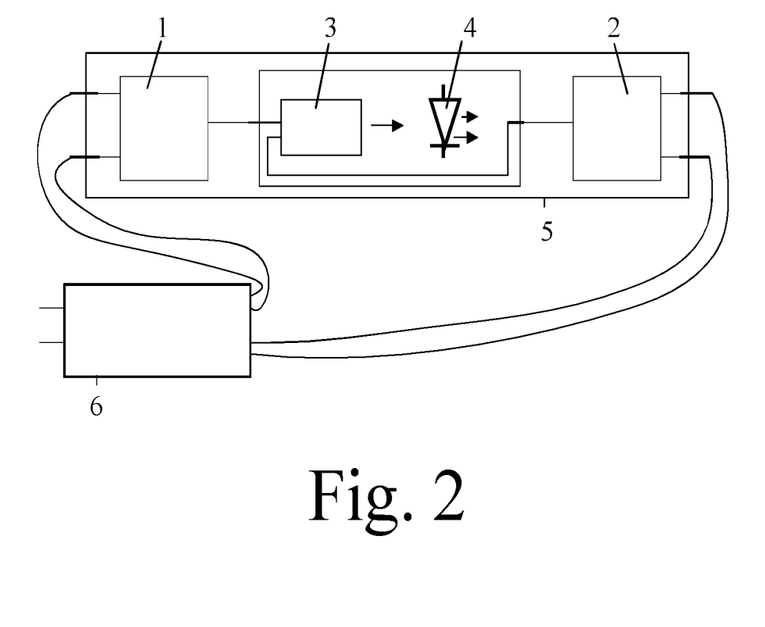
FIG. 2 shows an embodiment of a lamp.

In the FIG. 2, an embodiment of a lamp is shown. The lamp 5 comprises a filament circuit 1 such as for example a first filament circuit, a second filament circuit 2, a driver 3 and a light source 4, such as for example a light emitting diode circuit. A first filament-input of the filament circuit 1 is coupled to a first ballast-output of a ballast 6, and a second filament-input of the filament circuit 1 is coupled to a second ballast-output of the ballast 6. A filament-output of the filament circuit 1 is coupled to a driver-input of the driver 3. A third filament-input of the second filament circuit 2 is coupled to a third ballast-output of the ballast 6, and a fourth filament-input of the second filament circuit 2 is coupled to a fourth ballast-output of the ballast 6. A further filament-output of the second filament circuit 2 is coupled to a further driver-input of the driver 3. The driver 3 is configured to drive the light source 4. The lamp 5 is configured to be powered via the ballast 6, such as for example an electronic ballast. Ballast-inputs of the ballast 6 are configured to be coupled to a supply such as mains. The lamp 5 may for example comprise a retrofit tube for replacing a fluorescent tube while keeping the ballast 6 that has originally been designed to be used in combination with such a fluorescent tube.

Figure 3:
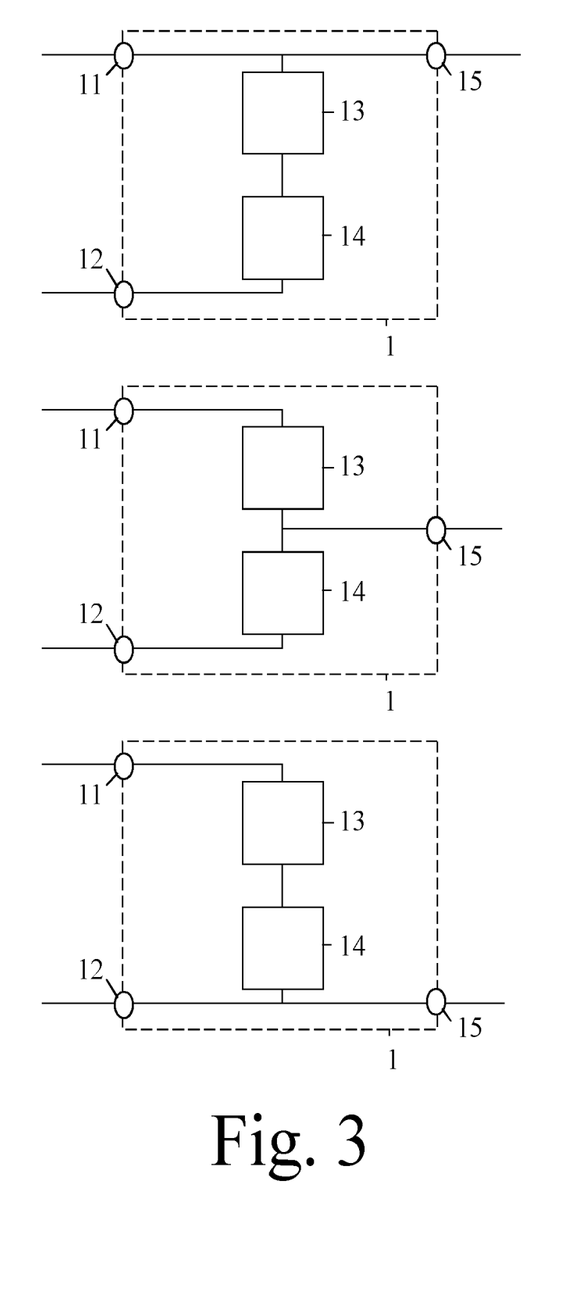
FIG. 3 shows a general embodiment of a filament circuit.

In the FIG. 3, a general embodiment of a filament circuit is shown. This filament circuit 1 comprises a first filament-input 11 configured to be coupled to the first ballast-output of the ballast 6, and a second filament-input 12 configured to be coupled to the second ballast-output of the ballast 6. The filament circuit 1 further comprises a first circuit 13 coupled to the first filament-input 11 and a second circuit 14 coupled to the second filament-input 12. The first circuit 13 comprises a resistive component, and the second circuit 14 comprises a reactive component. There is a direct-current path between the first filament-input 11 and the second filament-input 12. A series configuration of the first and second circuits 13, 14 comprises this direct-current path. The filament circuit 1 further comprises a filament-output 15 configured to be coupled to the driver-input of the driver 3.

In the upper drawing, the filament-output 15 is formed by the first filament-input 11. In the middle drawing, the filament-output 15 is formed by an interconnection between the first and second circuits 13, 14. In the lower drawing, the filament-output 15 is formed by the second filament-input 12.

Figure 4:
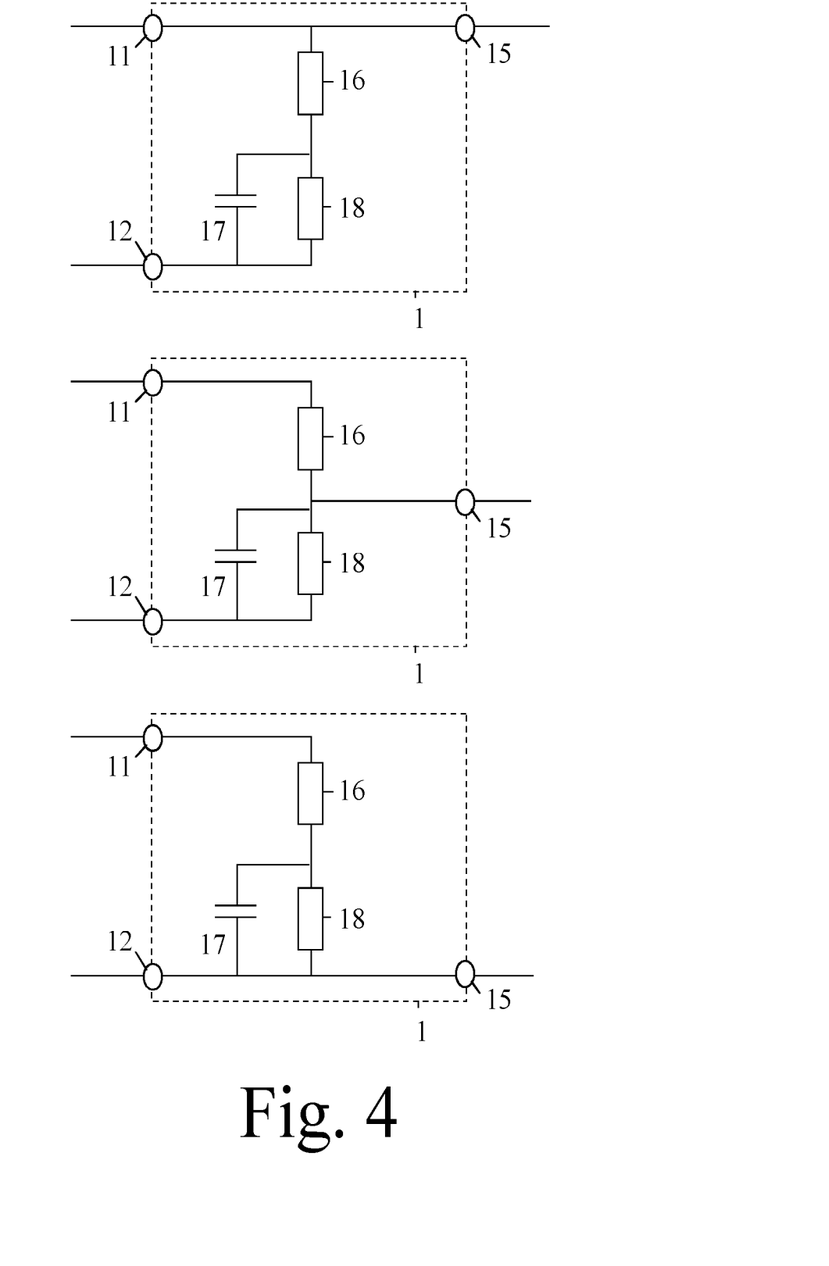
FIG. 4 shows a first embodiment of a filament circuit.

In the FIG. 4, a first embodiment of a filament circuit is shown. The resistive component discussed for the FIG. 3 comprises a first resistor 16, and the reactive component discussed for the FIG. 3 comprises a first capacitor 17 coupled in parallel to a second resistor 18. In the upper drawing, the filament-output 15 is formed by the first filament-input 11. In the middle drawing, the filament-output 15 is formed by an interconnection between the first resistor 16 and the parallel configuration of the first capacitor 17 and the second resistor 18. In the lower drawing, the filament-output 15 is formed by the second filament-input 12.

The parallel configuration of the first capacitor 17 and the second resistor 18 allows a DC current to flow through the second circuit 14 such that the direct-current path is present. Preferably, the filament circuit 1 comprises the first resistor 16, the first capacitor 17 and the second resistor 18 only, whereby each resistor 16, 18 may be realized through one resistor or through two or more resistors in whatever configuration, and whereby each capacitor 17 may be realized through one capacitor of whatever kind or through two or more capacitors of whatever kind and in whatever configuration.

Figure 5:
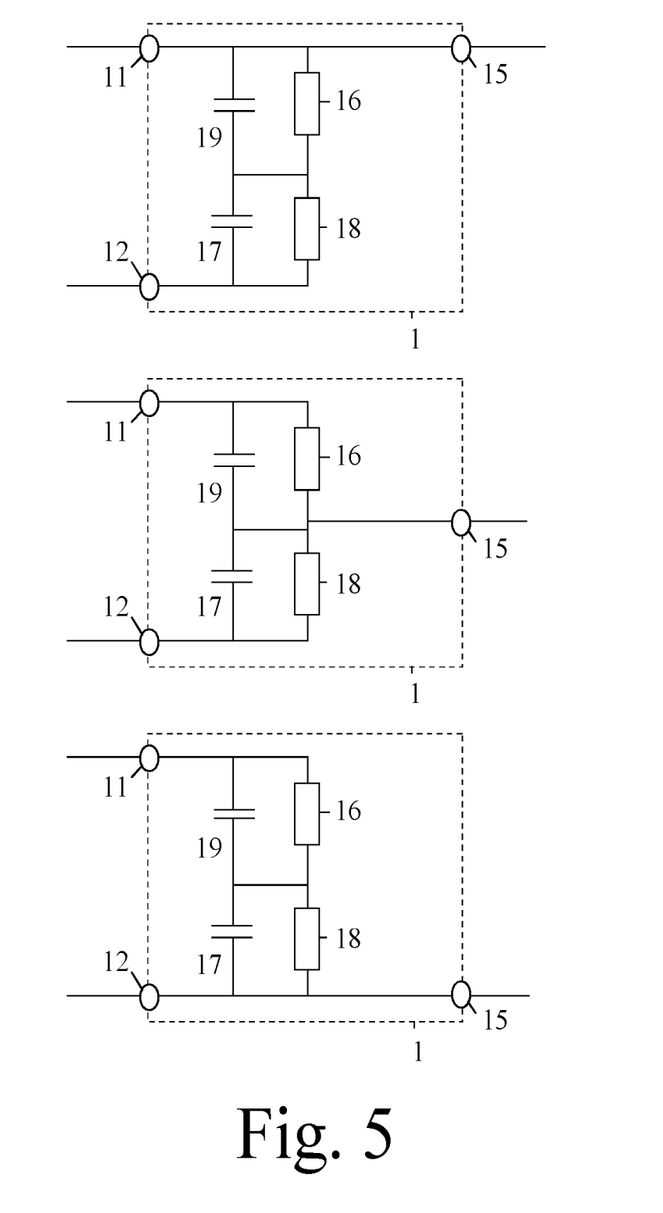
FIG. 5 shows a second embodiment of a filament circuit.

In the FIG. 5, a second embodiment of a filament circuit is shown. This second embodiment differs from the first embodiment in that, in the first circuit 13, the first resistor 16 is coupled in parallel to a second capacitor 19. The parallel configuration of the first resistor 16 and the second capacitor 19 allows a DC current to flow through the first circuit 13 such that the direct-current path is present. Preferably, the filament circuit 1 comprises the first resistor 16, the first capacitor 17, the second resistor 18 and the second capacitor 19 only, whereby each resistor 16, 18 may be realized through one resistor or through two or more resistors in whatever configuration, and whereby each capacitor 17, 19 may be realized through one capacitor of whatever kind or through two or more capacitors of whatever kind and in whatever configuration.

The first embodiment shown in the FIG. 4 has, compared to the second embodiment shown in the FIG. 5, fewer elements. The second embodiment shown in the FIG. 5 has, compared to the first embodiment shown in the FIG. 4, a reduced (high frequency) power dissipation.

Figure 6:
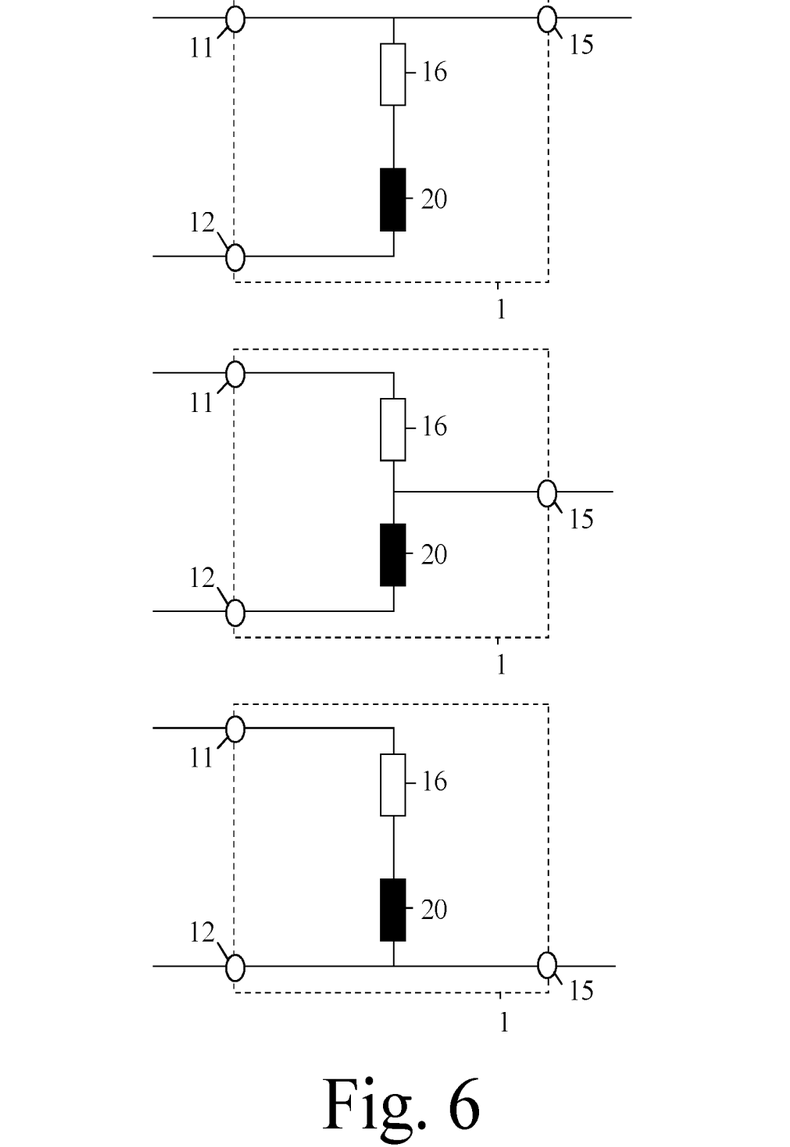
FIG. 6 shows a third embodiment of a filament circuit.

In the FIG. 6, a third embodiment of a filament circuit is shown. The resistive component discussed for the FIG. 3 comprises a first resistor 16, and the reactive component discussed for the FIG. 3 comprises an inductor 20. In the upper drawing, the filament-output 15 is formed by the first filament-input 11. In the middle drawing, the filament-output 15 is formed by an interconnection between the first resistor 16 and the inductor 20. In the lower drawing, the filament-output 15 is formed by the second filament-input 12.

The inductor 20 allows a DC current to flow through the second circuit 14 such that the direct-current path is present. Preferably, the filament circuit 1 comprises the first resistor 16 and the inductor 20 only, whereby each resistor 16 may be realized through one resistor or through two or more resistors in whatever configuration, and whereby each inductor 20 may be realized through one inductor of whatever kind or through two or more inductors of whatever kind and in whatever configuration.

Figure 7:
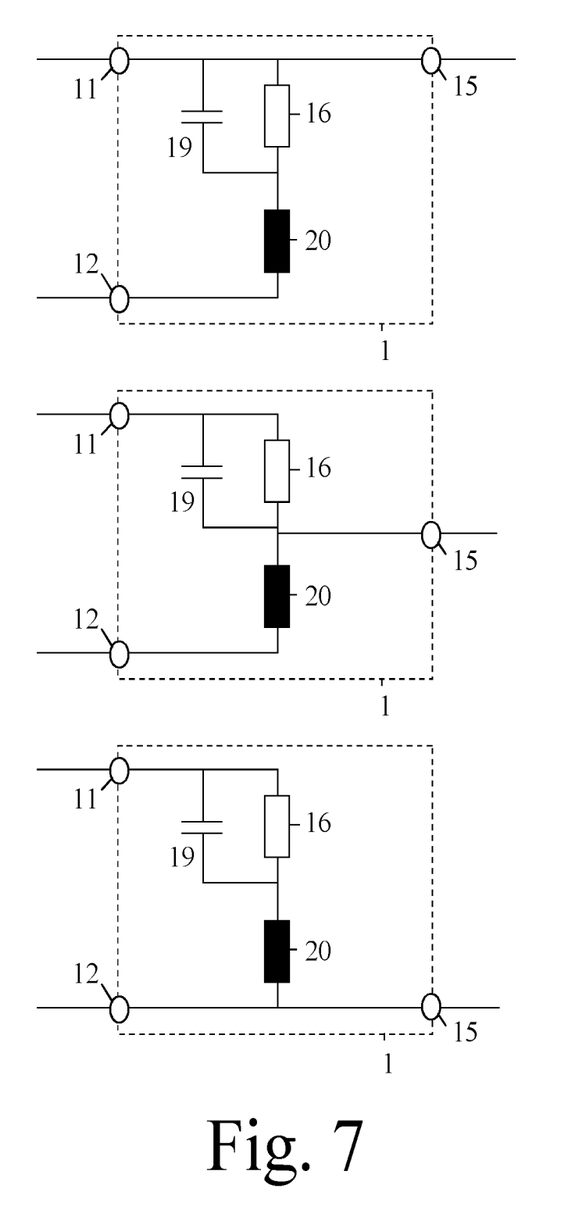
FIG. 7 shows a fourth embodiment of a filament circuit.

In the FIG. 7, a fourth embodiment of a filament circuit is shown. This fourth embodiment differs from the third embodiment in that, in the first circuit 13, the first resistor 16 is coupled in parallel to a second capacitor 19. The parallel configuration of the first resistor 16 and the second capacitor 19 allows a DC current to flow through the first circuit 13 such that the direct-current path is present here. Preferably, the filament circuit 1 comprises the first resistor 16, the second capacitor 19 and the inductor 20 only, whereby each resistor 16 may be realized through one resistor or through two or more resistors in whatever configuration, whereby each capacitor 19 may be realized through one capacitor of whatever kind or through two or more capacitors of whatever kind and in whatever configuration, and whereby each inductor 20 may be realized through one inductor of whatever kind or through two or more inductors of whatever kind and in whatever configuration.

The third embodiment shown in the FIG. 6 has, compared to the fourth embodiment shown in the FIG. 7, fewer elements. The fourth embodiment shown in the FIG. 7 has, compared to the third embodiment shown in the FIG. 6, a reduced (high frequency) power dissipation.

In the FIGS. 3, 4, 5, 6 and 7, the filament-output 15 may be formed by the first filament-input 11, by the interconnection between the first and second circuits 13, 14, or by the second filament-input 12. In other words, the filament-output 15 may be derived from and/or comprise and/or be coupled to and/or be connected to the first filament-input 11, the interconnection between the first and second circuits 13, 14, or the second filament-input 12. Or the first filament-input 11, the interconnection between the first and second circuits 13, 14, or the second filament-input 12 may comprise and/or be coupled to and/or be connected to the filament-output 15.

Figure 8:
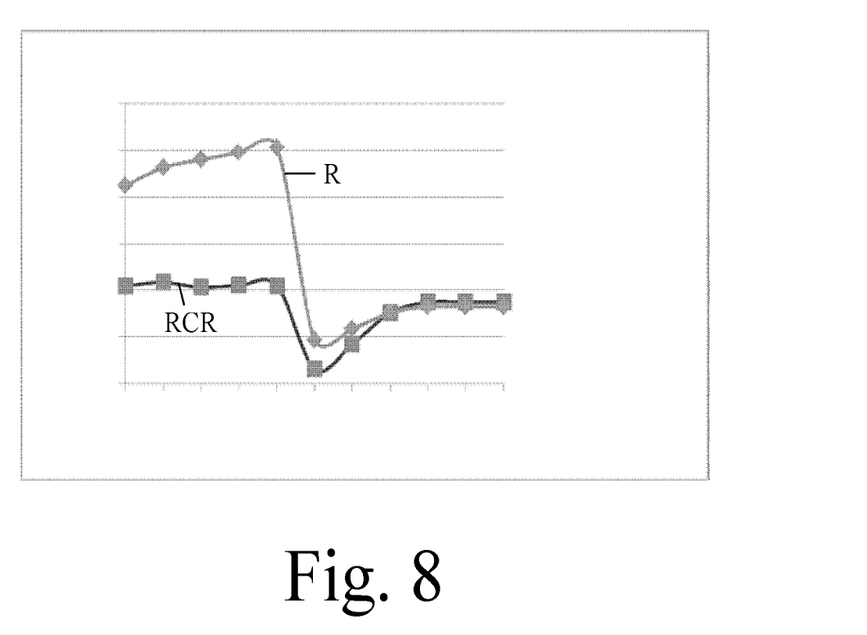
FIG. 8 shows waveforms.

In the FIG. 8 waveforms are shown (vertical axis: power dissipation increasing in an upward direction, horizontal axis: light intensity increasing from left to right, in a dimming situation). The upper graph indicated by R corresponds with the power dissipation in a prior art filament circuit in the form of a pure resistive filament circuit. The lower graph indicated by RCR corresponds with the power dissipation in a filament circuit 1 as shown in the FIG. 4. In a dimming situation, a frequency of a signal as produced by an electronic ballast increases when a light output decreases. Clearly, in such a dimming situation, compared to the prior art filament circuit, the power dissipation in the filament circuit 1 is reduced much. This is due to the fact that a reactive component in the filament circuit reduces a power dissipation in a resistive component. In case of a capacitor coupled in parallel to a resistor, for a high frequency current the capacitor has a reduced impedance and thereby reduces the power dissipation in the resistor. In case of an inductor coupled serially to a resistor, for the high frequency current the inductor has an increased impedance and thereby reduces the power dissipation in the resistor.

First and second elements can be coupled in many different ways, for example in an indirect way and in a direct way. When being coupled indirectly, the first and second elements are coupled via a third element. When being coupled directly, the first and second elements are coupled without the third element being in between. Similarly, an output can be derived from an input or from an interconnection in many different ways, for example indirectly, via an element, or directly, without the element being in between.

Summarizing, filament circuits 1 for lamps 5 powered via ballasts 6 comprise first filament-inputs 11 coupled to first ballast-outputs, second filament-inputs 12 coupled to second ballast-outputs, first circuits 13 comprising resistive components, second circuits 14 comprising reactive components, direct-current paths between the first and second filament-inputs 11, 12 whereby series configurations of the first and second circuits 13, 14 comprise these direct-current paths, and filament-outputs 15 coupled to a driver-input of a driver 3 for driving a light source 4 of the lamp 5. These filament-outputs 15 may correspond with the first filament-inputs 11, with the second filament-inputs 12 or with interconnections between the first and second circuits 13, 14. The resistive components may comprise first resistors 16. The reactive components may comprise first capacitors 17 with the second circuits 14 comprising parallel configurations of the first capacitors 17 and second resistors 18, or the reactive components may comprise inductors 20. The first circuits 13 may comprise parallel configurations of the first resistors 16 and second capacitors 19.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A filament circuit for a lamp, which lamp is configured to be powered via a ballast, the filament circuit comprising:
   a first filament-input configured to be coupled to a first ballast-output of the ballast,
   a second filament-input configured to be coupled to a second ballast-output of the ballast,
   a first circuit comprising an inductor,
   a second circuit comprising a parallel configuration of a resistor and a capacitor,
   a direct-current path between the first filament-input and the second filament-input, a series configuration of the first and second circuits comprising the direct-current path, and
   a filament-output configured to be coupled to a driver-input of a driver for driving a light source of the lamp, wherein the filament-output is directly derived
   a) from the first filament-input or
   b) from the second filament-input or
   c) from a junction between the first circuit and the second circuit.

2. A device comprising the filament circuit as defined in claim 1, the device further comprising the driver, wherein the filament-output is coupled to the driver input.

3. The device as defined in claim 2, wherein the filament circuit is a first filament circuit, and wherein the device further comprises a second filament circuit wherein the second filament circuit comprises:
   a third filament-input configured to be coupled to a third ballast-output of the ballast,
   a fourth filament-input configured to be coupled to a fourth ballast-output of the ballast,
   a third circuit comprising a further inductor,
   a fourth circuit comprising a further parallel configuration of a resistor and a capacitor,
   a further direct-current path between the third filament-input and the fourth filament-input, a series configuration of the third and fourth circuits comprising the further direct-current path, and
   a further filament-output coupled to a further driver-input of the driver, wherein the further filament-output is directly derived
   a') from the third filament-input or
   b') from the fourth filament-input; or
   c') from a junction between the first circuit and the second circuit.

4. The lamp comprising the device of claim 1 and further comprising the light source.

5. The lamp as defined in claim 1, wherein the light source comprises a light emitting diode circuit.

6. The filament circuit of claim 1, wherein the filament-output is directly derived from the junction between the first circuit and the second circuit.

7. A filament circuit for a lamp, which lamp is configured to be powered via a ballast, the filament circuit comprising
- a first filament-input configured to be coupled to a first ballast-output of the ballast,
- a second filament-input configured to be coupled to a second ballast-output of the ballast,
- a first circuit comprising a parallel configuration of a first resistor and a first capacitor,
- a second circuit comprising a parallel configuration of a second resistor and a second capacitor,
- a direct-current path between the first filament-input and the second filament-input, a series configuration of the first and second circuits comprising the direct-current path, and
- a filament-output configured to be coupled to a driver-input of a driver for driving a light source of the lamp, wherein the filament-output is directly derived
  - a) from the first filament-input or
  - b) from the second filament-input or
  - c) from a junction between the first circuit and the second circuit.

* * * * *